(12) United States Patent
Lin et al.

(10) Patent No.: US 6,890,590 B2
(45) Date of Patent: May 10, 2005

(54) METHOD FOR FORMING ANTI-GLARING AND ANTI-REFLECTING FILM

(75) Inventors: Chyi-Hung Lin, Tao-Yuan (TW);
Ta-Wang Lai, Tao-Yuan (TW);
Bor-Ping Wang, Tao-Yuan (TW);
Feng-Yu Huang, Tao-Yuan (TW);
Shun-Hsiang Ke, Tao-Yuan (TW);
Hsiu-Min Feng, Tao-Yuan (TW)

(73) Assignee: Optimax Technology Corporation, Tao-Yuan (TW)

( * ) Notice: Subject to any disclaimer, the term of this patent is extended or adjusted under 35 U.S.C. 154(b) by 31 days.

(21) Appl. No.: 10/414,215

(22) Filed: Apr. 16, 2003

(65) Prior Publication Data

US 2004/0209068 A1 Oct. 21, 2004

(51) Int. Cl.[7] .................................. B05D 5/06
(52) U.S. Cl. ..................... 427/164; 427/199; 427/493; 427/508
(58) Field of Search ................... 427/164, 493, 427/508, 199

(56) References Cited

U.S. PATENT DOCUMENTS

| | | | | |
|---|---|---|---|---|
| 5,723,175 A | * | 3/1998 | Scholz et al. ............... | 427/161 |
| 5,851,674 A | * | 12/1998 | Pellerite et al. ............. | 428/421 |
| 5,919,555 A | * | 7/1999 | Yasuda et al. ............... | 428/206 |
| 5,945,209 A | * | 8/1999 | Okazaki et al. ............. | 428/304.4 |
| 6,164,785 A | * | 12/2000 | Maekawa ..................... | 359/613 |
| 6,277,485 B1 | * | 8/2001 | Invie et al. .................. | 428/336 |
| 6,383,620 B1 | * | 5/2002 | Aoyama et al. ............. | 428/212 |
| 6,398,371 B1 | * | 6/2002 | Matsunaga et al. ......... | 359/614 |
| 6,808,742 B2 | * | 10/2004 | Rouse et al. ................. | 427/162 |

* cited by examiner

*Primary Examiner*—H. Thi Le
(74) *Attorney, Agent, or Firm*—Rosenberg, Klein & Lee

(57) ABSTRACT

A method for forming an anti-glaring and anti-reflecting film is disclosed in this invention. According to this invention, an anti-glaring and anti-reflecting film can be produced by a single coating process. Therefore, according to this invention, the manufacture of the anti-glaring and anti-reflecting film can be simplified, and the yield thereof can be improved. Preferably, the anti-glaring and anti-reflecting film of this invention further comprises the functions of anti-fouling and hard-coating. Accordingly, the design of this invention can provide a more powerful anti-glaring and anti-reflecting film.

12 Claims, 2 Drawing Sheets

METHOD FOR FORMING ANTI-GLARING AND ANTI-REFLECTING FILM

BACKGROUND OF THE INVENTION

1. Field of the Invention

This present invention relates to a method for forming optical film, and more particularly, to a method for forming an anti-glaring and anti-reflecting film.

2. Description of the Prior Art

Monitor becomes an important tool in the recent years. With the technology developing, the displaying quality requirement of a monitor is more and more higher. In order to improve the displaying quality, the anti-glaring and anti-reflecting film plays an important role in a monitor. In the prior art, a resin with a plurality of particles therein is employed for the anti-glaring function by the scattering of the particles. For providing the anti-reflecting function, the interference of the stack of 2 or 3 resin layers with different refractive index is used to lower the reflection in the prior art.

FIG. 1 depicts an anti-glaring and anti-reflecting film in the prior art. Referring to FIG. 1, the anti-glaring and anti-reflecting film comprises an anti-glaring layer 120 and an anti-reflecting layer 140 formed on a substrate 100. In the prior art, the anti-glaring layer 120 is formed by adding a plurality of particles into a resin and coating the mixture of the particles and the resin onto the substrate 100. The diameter of the particles is usually about 1~100 nm, or 300~3000 nm. The anti-reflecting layer 140 is formed by coating two or more resin layers with high refractive index to lower the reflection.

According to the structure in the prior art, the anti-glaring and the anti-reflecting film is obtained by two or more coating processes. The difficulty and complexity of the anti-glaring and anti-reflecting film manufacture will be increased by the above-mentioned design, and the yield of the anti-glaring and anti-reflecting film will also be decreased by the above-mentioned design. Besides, the thickness of the anti-glaring and anti-reflecting film will be increased by the several coating processes as mentioned above. Therefore, the anti-glaring and anti-reflecting film in the prior art will gradually lose its competitiveness in recent years.

Hence, for improving the yield and the competitiveness of the anti-glaring and anti-reflecting film, it is an important object to provide a method for forming an anti-glaring and anti-reflecting film.

SUMMARY OF THE INVENTION

In accordance with the present invention, a method for forming an anti-glaring and anti-reflecting film is provided. The anti-glaring and anti-reflecting film of this present invention can be formed through a single coating process, so that the manufacture of the anti-glaring and anti-reflecting film can be simplified.

It is another object of this invention to provide a method for forming an anti-glaring and anti-reflecting film, and the yield of the anti-glaring and anti-reflecting film can be improved by a single coating process.

It is still another object of this present invention to provide a method for forming an anti-glaring and anti-reflecting film through a single coating process, and the anti-glaring and anti-reflecting film comprises anti-glaring and anti-reflecting functions by employing a plurality of particles with special particle size therein.

It is still another object of this present invention to provide method for forming an anti-glaring and anti-reflecting film with anti-fouling and hard coating functions by employing a plurality of particles with special material therein.

In accordance with the above-mentioned objects, the invention provides a method for forming an anti-glaring and anti-reflecting film. The above-mentioned method comprises the steps of providing a substrate, and forming an anti-glaring and anti-reflecting layer on the substrate. The anti-glaring and anti-reflecting layer at least comprises a resin and a plurality of particles, wherein the diameter of the particles is about 200~300 nm. According to this invention, the anti-glaring and the anti-reflecting layer can be produced by a single coating process. Thus, the manufacture of the anti-glaring and the anti-reflecting film can be simplified, and the manufacture yield of the anti-glaring and anti-reflecting film can be improved. Preferably, the anti-glaring and anti-reflecting film of this invention further comprises anti-fouling and hard-coating functions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Then, the components disclosed in this application are not shown to scale. Some dimensions are exaggerated to the related components to provide a more clear description and comprehension of the present invention.

One preferred embodiment of this invention is a method for forming an anti-glaring and anti-reflecting film. The above-mentioned method at least comprises the steps of providing a substrate, and forming an anti-glaring and anti-reflecting layer on the substrate. According to this embodiment, the anti-glaring and anti-reflecting layer can be formed by a single coating process for coating a mixture on the substrate, wherein the mixture comprises a resin and a plurality of particles.

According to this embodiment, the anti-glaring and anti-reflecting layer comprises a first portion of the particles self-assembling at the topmost of the anti-glaring and anti-reflecting layer, and thus the anti-glaring and anti-reflecting film can show anti-reflecting and anti-fouling functions provided by the first portion of the particles. Moreover, in the anti-glaring and anti-reflecting layer, the resin and a second portion of the particles between the first portion of the particles and the substrate can provide anti-glaring and hard-coating functions. Therefore, the anti-glaring and anti-reflecting layer formed by a single coating process can show the functions of anti-glaring, anti-reflecting, anti-fouling, and hard-coating. Thus, the manufacture of an anti-glaring and anti-reflecting film can be simplified by the design of this present invention, and the yield and the competition ability of the manufacture of anti-glaring and anti-reflecting film can be improved by this present invention. Moreover, besides the above-mentioned powerful functions, the definition of the anti-glaring and anti-reflecting film of this embodiment is excellent.

Figure 1:
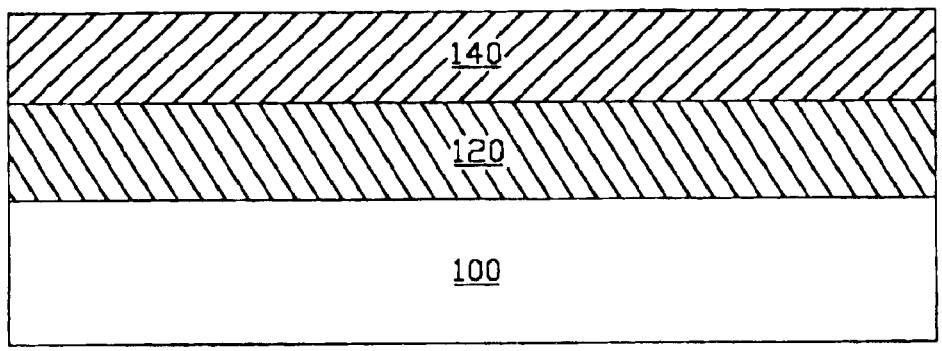
FIG. 1 shows an anti-glaring and anti-reflecting film according to the prior art.
Figure 2:
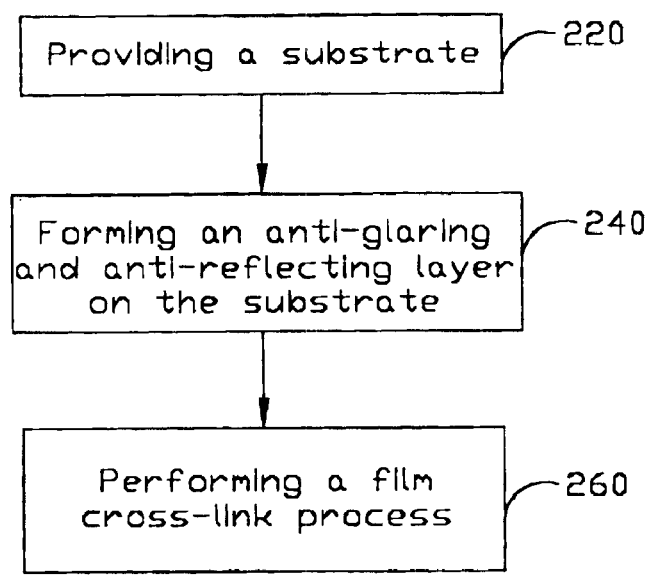
FIG. 2 shows a flowchart of forming an anti-glaring and anti-reflecting according to this presented invention.

Another preferred embodiment of this present invention is a method for forming an anti-glaring and anti-reflecting film. FIG. 2 shows a flowchart for forming an anti-glaring and anti-reflecting film of this embodiment. Referring to FIG. 2, first of all, a substrate is provided, as the step 220. The substrate may be consisted of a transparent material. In one case of this embodiment, the substrate may comprise triacetyl cellulose (TAC), or polyethylene terephthalate (PET), or other transparent materials.

Subsequently, as the step 240 in FIG. 2, an anti-glaring and anti-reflecting layer is formed on the substrate. The anti-glaring and anti-reflecting layer at least comprises a resin and a plurality of particles, wherein the diameter of the particles is about 200~300 nm. According to this embodiment, the anti-glaring and anti-reflecting layer can be formed by coating the mixture comprising the particles and the resin on the substrate. The particles of this embodiment may comprise fluoride. The step 240 may be achieved by a single coating process.

After forming the anti-glaring and anti-reflecting layer, a film cross-link process is performed, as the step 260. The film cross-link process comprises a heating treatment and an UV curing treatment. The heating treatment may be performed in an oven. One subject of the above-mentioned heating treatment is removing the residue solvent in the anti-glaring and anti-reflecting layer. Preferably, it may cost a short time during the heating treatment, and some particles are self-assembling at the topmost of the anti-glaring and anti-reflecting layer during the heating treatment. After employing the UV curing treatment to fix the anti-glaring and the anti-reflecting layer, the anti-glaring and anti-reflecting layer comprises a first portion of the particles self-assembling at the topmost thereof, and a second portion of the particles dispersing between the first portion of the particles and the substrate.

In this embodiment, the anti-reflecting function of the anti-glaring and anti-reflecting layer can be provided by the first portion of the particles, and the anti-glaring function of the anti-glaring and anti-reflecting layer can be provided by the second portion of the particles and the resin between the first portion of the particles and the substrate. Therefore, according to this embodiment, an anti-glaring and anti-reflecting film can be produced by a single coating process. Thus, the manufacture of an anti-glaring and anti-reflecting film can be simplified, and the yield of the anti-glaring and anti-reflecting film can be improved by the design of this embodiment.

Moreover, because of the character of the particles of the anti-glaring and anti-reflecting layer, the anti-glaring and anti-reflecting layer can further comprise the anti-fouling function provided by the first portion of the particles self-assembling at the topmost of the anti-glaring and anti-reflecting layer. Besides, in one case of this embodiment, the resin may be a hard coat resin, and thus the anti-glaring and anti-reflecting layer can further comprise the hard-coating function provided by the resin and the second portion of the particles between the first portion of the particles and the substrate. Therefore, besides the functions of anti-glaring and anti-reflecting, the anti-glaring and anti-reflecting film of this embodiment further comprises the functions of anti-fouling and hard-coating. That is, according to this present invention, through a single coating process, an anti-glaring and anti-reflecting film with more powerful functions can be produced.

Figure 3:
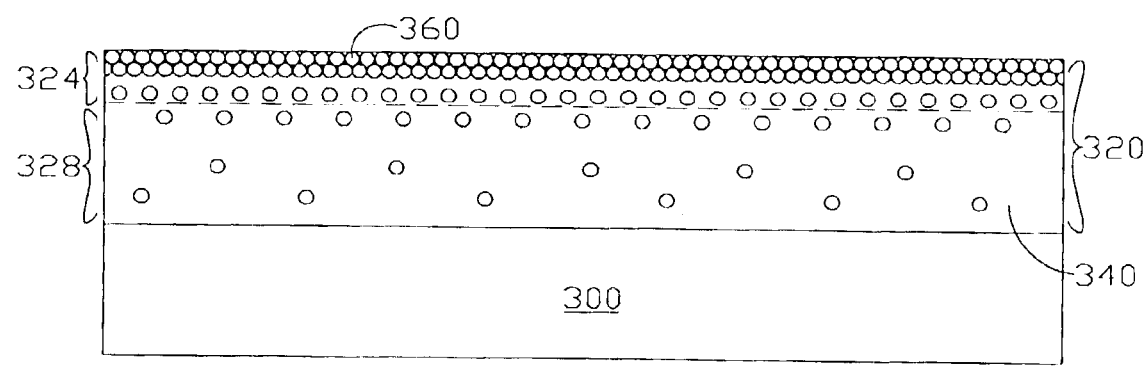
FIG. 3 depicts an anti-glaring and anti-reflecting according to this invention.

Another preferred embodiment according to this present invention is an anti-glaring and anti-reflecting film. FIG. 3 depicts an anti-glaring and anti-reflecting film according to this embodiment. Referred to FIG. 3, the anti-glaring and anti-reflecting film comprises a substrate 300, and an anti-glaring and anti-reflecting layer 320. The substrate 300 may be consisted of triacetyl cellulose (TAC), polyethylene terphthalate (PET), or other transparent materials.

The anti-glaring and anti-reflecting layer 320 at least comprises a resin 340, and a plurality of fluoride particles 360. In one preferred case of this embodiment, the resin may be a hard coat resin, wherein the hard coat resin is helpful for increasing the hardness of the anti-glaring and anti-reflecting film. The diameter of the above-mentioned fluoride particles 360 is about 200~300 nm. In one case of this embodiment, the fluoride particles 360 comprise fluoro-containing silica.

According to the design of this embodiment, the anti-glaring and anti-reflecting film can be produced by a single coating process for coating the mixture of the resin 340 and the fluoride particles 360 on the substrate 300. Next, a heating process is employed to remove the residue solvent in the anti-glaring and anti-reflecting layer 320, and an UV curing process is performed for fixing the anti-glaring and anti-reflecting layer 320 on the substrate 300 to form the anti-glaring and anti-reflecting film of this embodiment.

After the single coating process, because of the physical character of the fluoride particles, some of the fluoride particles 360 are self-assembling at the topmost of the anti-glaring and anti-reflecting layer 320. Referring to FIG. 3, the anti-glaring and anti-reflecting layer 320 comprises a first layer 324 comprising a first portion of the fluoride particles 360, and a second layer 328 comprising a second portion of the fluoride particles 360 and the resin 340. The above-mentioned second layer 328 is between the first layer 324 and the substrate 300.

According to this embodiment, because of the excellent scattering effect of the particles with the diameter about 200~300 nm, the anti-glaring and anti-reflecting layer 320 comprises the excellent anti-reflecting function provided by the first layer 324. Moreover, the anti-glaring and anti-reflecting layer 320 further comprises the anti-glaring function provided by the resin 340 and the second portion of the fluoride particles 360 in the second layer 328. Additionally, because of the special character of the fluoride particles 360 employed in this embodiment, the anti-glaring and anti-reflecting layer 320 of this embodiment further comprises the anti-fouling function provided by the above-mentioned first layer 324. Besides, the second layer 328 comprising the second portion of the fluoride particles 360 and the resin 340 can provide the hard-coating function to the anti-glaring and anti-reflecting layer 320. Thus, this embodiment can provide an anti-glaring and anti-reflecting film with the functions of anti-glaring, anti-reflecting, anti-fouling, and hard coating through a single coating process.

In one study result of this invention, the reflectivity and the refractive index of the fluoride particles 360 are decreasing with the increasing component of fluorine in the fluoride particles 360. In other words, when increasing the ratio of fluorine in the fluoride particles 360, the anti-glaring and anti-reflecting characters of the anti-glaring and anti-reflecting film of this embodiment is improved. In one case of this embodiment, the fluoride particle 360 may comprise fluorine in weight of about 10% to about 30% of the fluoride particle 360. In another preferred case, the fluoride particle 360 comprises fluorine in molecular weight of about 20% of the fluoride particle 360, and thus the anti-glaring and anti-reflecting functions of the anti-glaring and anti-reflecting film of this embodiment are excellent.

In the prior art, the anti-reflecting function of the anti-glaring and anti-reflecting film is provided by coating two or more layers of the resins with different refractive index. Besides, a resin with a plurality of particles added therein is employed for providing the anti-glaring function by the scattering effect of the particles. The refractive index of the particles is similar to the refractive index of the resin in the anti-glaring layer. In other words, at least two coating process should be employed for producing the anti-glaring and anti-reflecting film in the prior art. Therefore, the manufacture of the anti-glaring and anti-reflecting film in the prior art is difficult and complex, and the yield of the manufacture will be decreased.

However, according to this present invention, the anti-glaring and anti-reflecting film can be produced by a single coating process for coating a mixture of a resin and a plurality of particles on a substrate. According to this invention, the refractive index of the particles is smaller than the refractive index of the resin. Therefore, this invention can efficiently simplify the manufacture and improve the yield of the manufacture. Furthermore, besides the functions of anti-glaring and anti-reflecting, the anti-glaring and anti-reflecting film of this invention further comprises the functions of anti-fouling and hard-coating. Thus, the anti-glaring and anti-reflecting film of this invention is more powerful than the anti-glaring and anti-reflecting film in the prior art. Preferably, the thickness of the anti-glaring and anti-reflecting film of this invention is less than the thickness of the anti-glaring and anti-reflecting film in the prior art. Hence, when the size of the displayer becomes more and more small, the thickness of the anti-glaring and anti-reflecting film of this invention will not become the limitation of the design of the displayer. More preferably, because of the character of the particles and the thickness of the anti-glaring and anti-reflecting film, the anti-glaring and anti-reflecting film of this invention still can keep an excellent definition.

According to the preferred embodiments, this invention discloses a method for forming an anti-glaring and anti-reflecting film. The above-mentioned method comprises the steps of providing a substrate, and forming an anti-glaring and anti-reflecting layer on the substrate. The anti-glaring and anti-reflecting layer at least comprises a resin and a plurality of particles with the diameter about 200~300 nm. The constitution of the particles employed in this invention may comprise fluoride. According to this invention, the anti-glaring and anti-reflecting film can be produced by a single coating process for coating the mixture of the resin and the particles on the substrate. Therefore, this invention can efficiently simplify the manufacture of the anti-glaring and anti-reflecting film, and improve the yield of the anti-glaring and anti-reflecting film. Preferably, besides the functions of anti-glaring and anti-reflecting, the anti-glaring and anti-reflecting film of this invention further comprises the functions of anti-fouling and hard coating.

Although specific embodiments have been illustrated and described, it will be obvious to those skilled in the art that various modifications may be made without departing from what is intended to be limited solely by the appended claims.

What is claimed is:

1. A method for forming an anti-glaring and anti-reflecting film, comprising:
   providing a substrate;
   coating a mixture of a plurality of particles and a resin on said substrate; and
   executing a film cross-link process to make a portion of said plurality of particles self assembling at the topmost of said coating.

2. The method according to claim 1, wherein said substrate is consisted of a transparent material.

3. The method according to claim 1, wherein said substrate comprises triacetyl cellulose (TAC).

4. The method according to claim 1, wherein said substrate comprises polyethylene terephthalate (PET).

5. The method according to claim 1, wherein the refractive index of said plurality of particles is smaller than that of said resin.

6. The method according to claim 1, wherein the diameter of said plurality of particles is in the range of 200~300 nm.

7. The method according to claim 1, wherein said resin is a hard coat resin.

8. The method according to claim 1, wherein said plurality of particles comprise fluoride particles.

9. The method according to claim 8, wherein said fluoride particles comprise fluorine in molecular weight of about 10% to 30%.

10. The method according to claim 8, wherein said fluoride particles comprise fluoro-containing silica.

11. The method according to claim 1, wherein said film cross-link process comprises a heating treatment.

12. The method according to claim 1, wherein said film cross-link process comprises a UV curing treatment.

* * * * *